United States Patent
Robinson

(10) Patent No.: US 7,023,426 B1
(45) Date of Patent: Apr. 4, 2006

(54) USER INPUT DEVICE

(75) Inventor: Ian Robinson, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 10/245,462

(22) Filed: Sep. 16, 2002

(51) Int. Cl.
*G06G 5/00* (2006.01)

(52) U.S. Cl. .................. 345/169; 345/168; 345/179

(58) Field of Classification Search ............ 345/169, 345/168, 178–184, 19.01–19.06
See application file for complete search history.

(56) References Cited

U.S. PATENT DOCUMENTS

| | | | |
|---|---|---|---|
| 6,130,666 A * | 10/2000 | Persidsky | 345/179 |
| 6,256,017 B1 * | 7/2001 | Bullister | 345/168 |
| 6,370,018 B1 * | 4/2002 | Miller et al. | 361/680 |
| 6,392,634 B1 * | 5/2002 | Bowers et al. | 345/163 |
| 6,422,775 B1 * | 7/2002 | Bramlett et al. | 401/195 |
| 6,427,078 B1 | 7/2002 | Wilska et al. | |
| 6,547,463 B1 * | 4/2003 | Loo | 400/472 |
| 6,594,142 B1 * | 7/2003 | Katz | 361/680 |
| 6,655,863 B1 * | 12/2003 | Lin | 400/491 |
| 6,734,809 B1 * | 5/2004 | Olodort et al. | 341/22 |
| 2003/0064686 A1 * | 4/2003 | Thomason et al. | 455/90 |
| 2003/0122804 A1 * | 7/2003 | Yamazaki et al. | 345/179 |

OTHER PUBLICATIONS

C Technologies AB, C-Pen 10, Aug. 29, 2002.
C Technologies AB, C-Pen 800C, Aug. 29, 2002.
C Technologies AB, C-Pen 10 Cover Page and User's Guide for C-Pen 10, Aug., 2001, pp. 23-32.

* cited by examiner

*Primary Examiner*—Amr A. Awad
*Assistant Examiner*—Motilewa Good-Johnson

(57) ABSTRACT

A user input device has a body portion extending from a first end to a second end and having a plurality of keys, for example keys that may be arranged and configured to be a keyboard, and an optical motion element. A wireless transmitter transmits data entered through the keys to a target component, for example a computer, a PDA, a digital watch, and the like. The user input device may include a hinged panel having some of the keys, and when the hinged panel is in an open configuration, the arrangement of the keys may be similar to an alphanumeric keyboard. The optical motion element may be an optical mouse for controlling a cursor on a display, when the hinged panel is open. When the hinged panel is closed the optical motion element may be configured to serve as a digital pen, for sensing natural writing, pen motions used to control a display, such as cursor location or to make selections on a menu, for example. The device may be sized so as to be easily portable, fit inside a pocket, and may be formed to have a shape similar to a writing instrument.

33 Claims, 8 Drawing Sheets

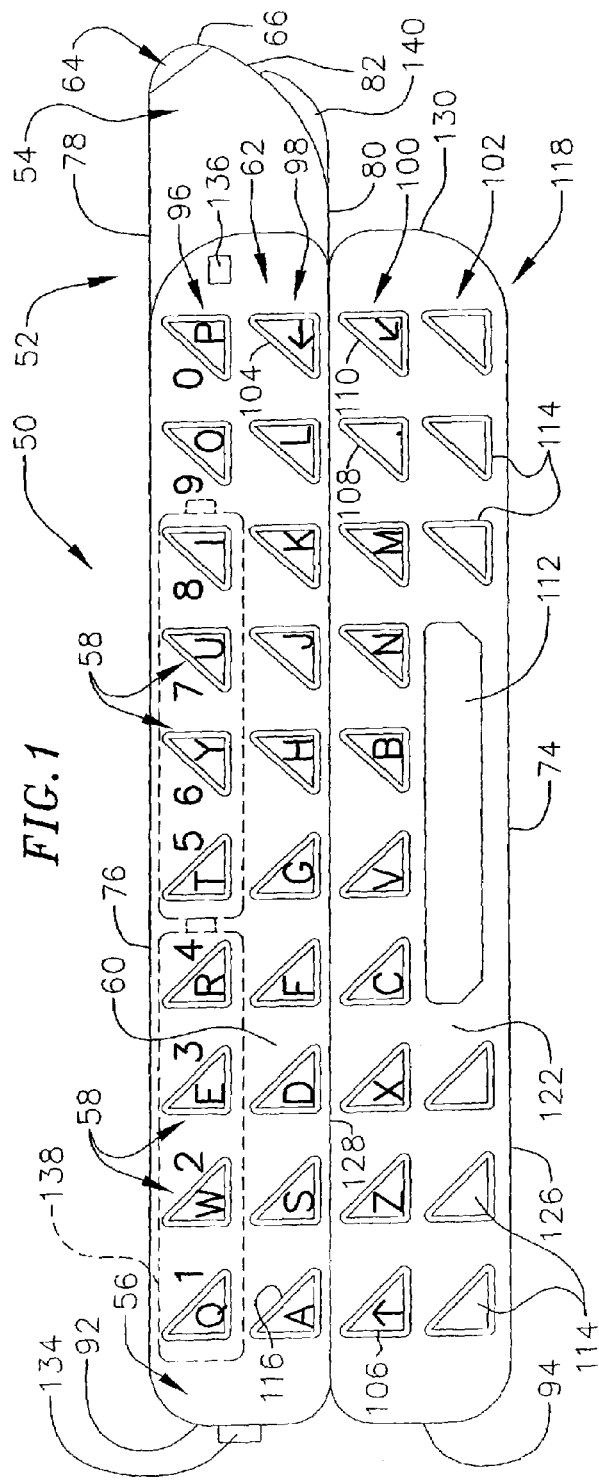
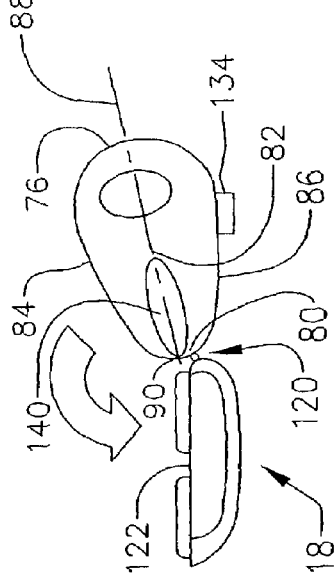
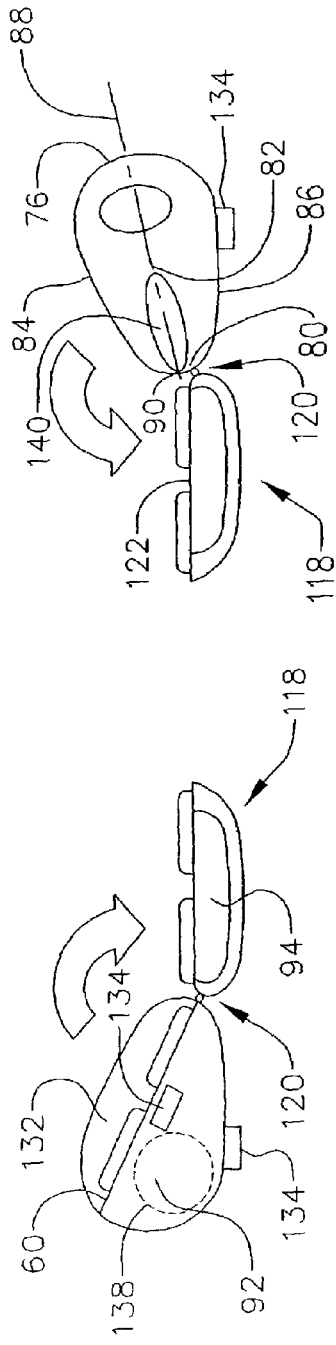

USER INPUT DEVICE

BACKGROUND OF THE INVENTIONS

1. Field of the Invention

The following relates to user input devices, including, keyboard, keypad, touch pad, cursor control devices, light pens, as well as other user input devices.

2. Related Art

With the proliferation of electronic devices, the number of different shapes, sizes and applications of electronic devices have increased dramatically. At the same time, and also concurrent with more efficient and compact designs, product sizes have become smaller. However, product size may still be dictated in many products by such considerations as the sizes of displays or viewing screens, and sizes of data input modes such as keyboards, keypads, and pressure sensitive screens. Consequently, the sizes, shapes or other configuration aspects of modern electronic devices may often be dictated by practical limitations on one or another of the individual components making up the device.

In such electronic devices as personal data assistants (PDAs) of the type existing at the time of filing of this application, for example, data input can be achieved through a pressure-sensitive display area, a special purpose keyboard hard wire connected to the PDA or through a link, hard wired or wireless, to a personal computer, or the like. Data entry through the display typically requires learning and using a recognizable alphanumeric symbol set representing alphabet and numbers, allowing the PDA to translate the input into data that can be displayed using conventional fonts. Data entry through a keyboard is faster and does not require character recognition or translation, but the keyboard is a special purpose keyboard usually specific to the device. Data entry through a personal computer typically occurs through the straight download of preexisting data. The download typically uses proprietary software and device-specific hardware.

Small devices such as wrist watches can be designed to accept and display a wide variety of information. For example, others have considered a wrist watch that can be used to access electronic information and services such as those available on the Internet. The watch can be designed to receive and display user identification data, personal location information, personal calendar, meeting and contact information and the like. Information would be downloaded from nearby computers or through a hardware connection, without which fast, easy and accurate data entry would be difficult.

As devices such as the foregoing digital watches and PDAs get smaller, convenient and accurate data entry become more important designed considerations.

SUMMARY OF THE INVENTIONS

Methods and apparatus are described for user input devices that allow such devices to be portable, relatively small in size, used in more than one mode, and possibly used together with a variety of electronic devices. The apparatus can be made small enough to fit in an average pocket, and can be used on a tabletop or other stable surface or by holding it in one's hands. It can be used to (1) enter data in alphanumeric characters as a full-sized keyboard would be used or to (2) enter data in natural handwritten form.

In one example of a user input device, a plurality of keys are arranged on part of the body of the device, for example in a manner permitting manipulation of the keys for entering data. An image control element is also mounted on the body, for use in controlling a characteristic of an image, for example the location of a cursor, and a wireless communication component is incorporated in the body for sending data or image control signals to an electronic device or target component. In one form of the device, the plurality of keys is arranged to be similar to a conventional keyboard for entering alphabet characters. Additionally, one or more function keys may be included so that the plurality of keys can also be used to enter other characters such as numbers, or to control the target device in other ways, such as to move a cursor, make menu selections, and the like. In another form of the device, the image control element can be placed on an outer part of the body, for example so as to be manually accessible when the keys are being used. The image control element can be a motion tracking element, for example an optical mouse sensitive to movement of a fingertip or similar surface across the mouse for moving a cursor, for example.

In another example of a user input device, a body portion extends from a first side to a second side and includes a plurality of keys arranged between the first and second sides for manipulation, such as to enter alphanumeric characters into a target component. A motion tracking element, for example an optical motion element, is placed near one side of the body portion to detect relative movement between the user input device and an adjacent surface. In one configuration, data can be entered into the target component using the keys of the device. Data in the form of natural handwriting notes or drawings can be entered through the optical motion element, or, alternatively, data may be entered through the optical motion element to allow a target component to convert handwriting to text. For example, the optical motion element can be positioned at an end point of the body portion and used in a manner similar to a writing instrument. The body portion can be configured to be relatively thin so that it can be grasped like a pen or pencil, and the optical motion element can be placed against a surface for movement to create letters, numbers and graphical symbols or drawings. The user input device could also be used in the same physical mode to move a cursor, make selections on a display device of the target component or for other purposes. A wireless connection may be used for data transfer.

In an additional example, a user input device could include a body portion extending lengthwise with a plurality of keys also arranged lengthwise, for example in spaced apart rows, for entering alphanumeric characters into a target component. The device further includes a panel movable between a closed position and an open position relative to the body portion, and on which is mounted additional keys. The keys together may provide an alphanumeric keyboard able to provide similar functions to existing alphanumeric keyboards. The device also includes a motion tracking element for tracking motion of the user input device relative to its environment, for example relative to a surrounding surface or relative to its position at an earlier point in time. In one example, the motion tracking element could be an optical motion element, for example an optical mouse, for detecting relative movement between the device and a surface or object within view of the optical element. In one configuration when the movable panel is in the open position, data can be entered through the keys and data or images in the target component can be manipulated or controlled through the optical element. When the movable panel is closed, the optical element can be used as a digital writing instrument for recording natural writing in the target component, either as image or converted to text. The optical element can be conveniently placed in a convergent end portion of the user input device, to make easier use of the device similar to a pen. A wireless connection may be used for data transfer.

In a further example, a user input device includes a body portion and a hinged panel each having respective rows of keys for entering alphanumeric data into a target component. The hinged panel is movable from an open position to a closed position relative to the body portion, so that in the closed position, the body portion has a cylindrical shape. One end of the cylindrical shape converges to a tip having an optical motion element, for example an optical mouse, for sensing relative movement between the device and an object. A wireless transmitter in the device can send data entered into the device to a target component. When the hinged panel is open, the keys can be used to enter data, which is transmitted to the target component. Additionally, when the hinged panel is open, the optical motion element can be configured to act as an optical mouse, for example to control a cursor or other image on a display or in the target component. When the hinged panel is closed, the optical motion element can be configured to operate in a manner similar to a digital pen. With the panel closed, the outer profile of the device is more compact and more easy to manipulate.

In use, a user input device can have a first configuration in which alphanumeric data can be entered into the device and transmitted to a target component through a keyboard or set of keys on the device, and an optical motion element in the device can be used as an optical mouse. In a second configuration, the optical motion element can be configured to operate in a digital pen mode to allow recording of natural writing or to allow a target component to convert natural writing to text.

These and other examples are set forth more fully below in conjunction with drawings, a brief description of which follows.

BRIEF DESCRIPTION OF THE DRAWINGS

FIG. 1 is a top plan view of an example of a user input device having a body portion and a panel that can be closed against the body portion according to one embodiment of the inventions.

FIG. 2 is a left end elevation view of the user input device shown in FIG. 1.

FIG. 3 is a right end elevation view of the user input device shown in FIG. 1.

DETAILED DESCRIPTION

Figure 4:
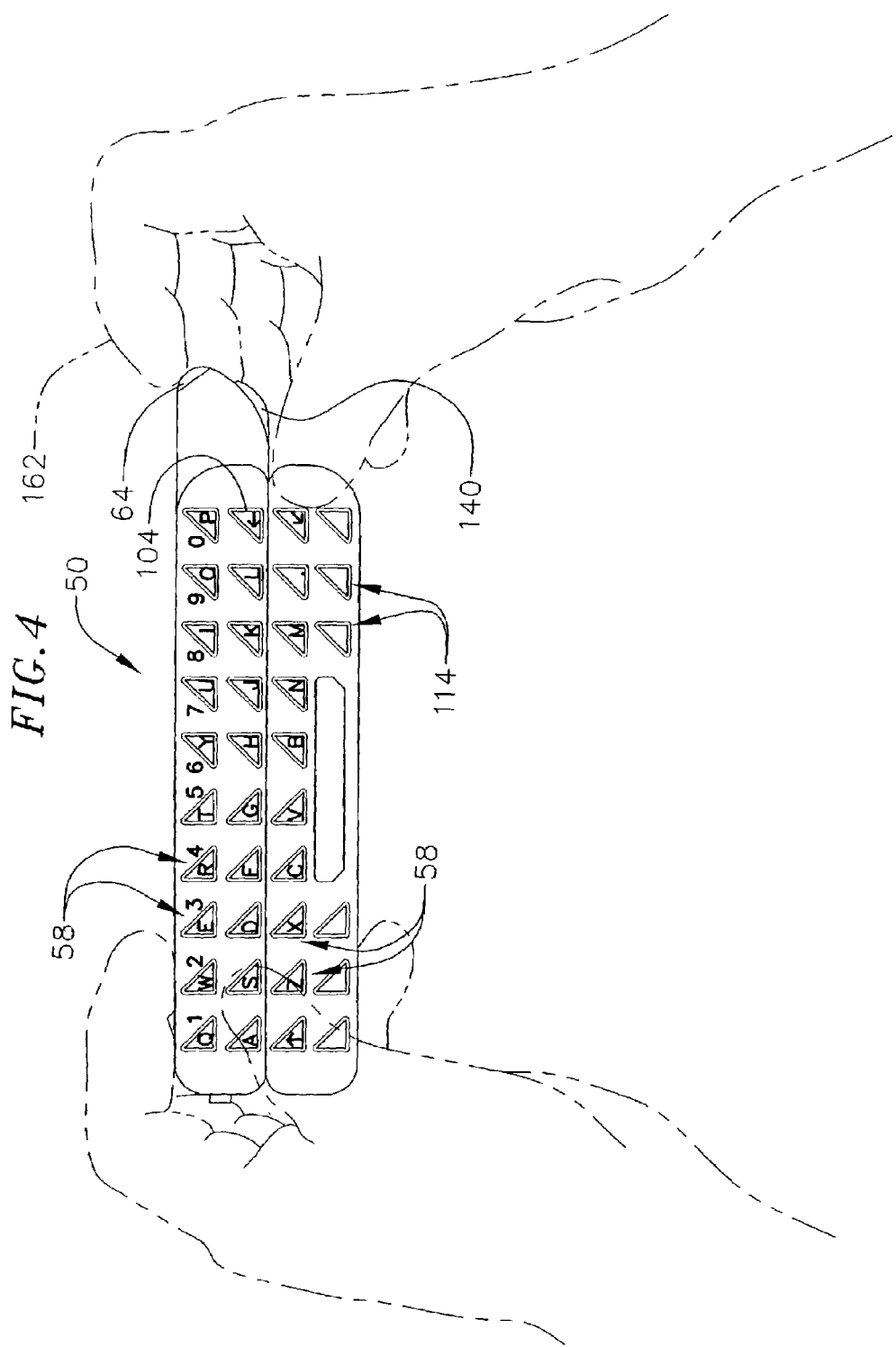
FIG. 4 is a top plan view of a user input device similar to that of FIG. 1 showing an example of the relative environment in which the device can be used.

The following specification taken in conjunction with the drawings sets forth the preferred embodiments of the present inventions in such a manner that any person skilled in the art can make and use the inventions. The embodiments of the inventions disclosed herein are the best modes contemplated by the inventor for carrying out the inventions in a commercial environment, although it should be understood that various modifications can be accomplished within the parameters of the present inventions.

A wide variety of electronic devices typically receive input from a user in only a few ways. Personal computers typically receive input through a keyboard hard wired or infrared linked to the personal computer, and through a mouse, also hard wired or infrared linked to the computer. Many people also use a joy stick for video games, graphic image processing such as video editing, and the like. Larger and more complex computers may also use these input modes. Electronic devices such as personal digital assistants (PDA) may receive input through a touch screen, or through another electronic device containing data input through a keyboard, for example. Other input modes may include a bar code reader or a graphics tablet or a digital pen.

The user input device of the present inventions can be configured to provide input to a large number of devices. The user input device can be used in conjunction with a personal computer, a PDA, an audiovisual device, a telecommunications device for example a cellular telephone, and the like. Examples of elements of the user input device will be described below, and examples of operation will be given in the context of a digital watch and a personal computer having a conventional display monitor. However, it should be understood that the inventions are not limited to these examples and can be applied to other apparatus and methods as well.

In one example of a user input device 50 (FIGS. 1–3), the device 50 includes a body 52 extending from a first side or end portion 54 to a second side or end portion 56, defining the length of the body. A plurality of keys 58 are incorporated into the body so as to be exposed for manipulation on a first surface 60 of the body. The keys can have any number of configurations, and the first surface can take a number of configurations, but in the example shown in FIGS. 1–3, the first surface 60 is flat from the second end portion 56 to a right keyboard end 62 in board from the first end portion 54. The first surface 60 is preferably flat for symmetry reasons in the example where the body 52 has a second part movable into place to be complementary with the rest of the body.

The user input device 50 includes a motion tracking element to track motion of the user input device relative to its surroundings or environment or a previous position, for example relative to a surface in the area or relative to its position at an earlier point in time. In the example shown in FIGS. 1–3, the motion tracking element is an optical motion element 64 positioned on the end of the first side 54 for sensing or detecting relative movement between the body 52 and a nearby object, such as a surface, a fingertip, or the like. In the example shown in FIG. 1, the first side 54 of the body 52 converges or tapers to a tip 66 and the optical motion element 64 completes the end of the tip. The size of the tip may be determined by the dimensions and orientation of the optical motion element 64 within the body. The optical motion element 64 can have a number of configurations, and the device 50 can be configured to allow switching between one optical motion element configuration and another. For example, in one configuration, the optical element 64 can be an optical mouse controlled by detection of movement of a nearby surface relative to the optical element. For example, a user may place a fingertip over the optical element 64 and the optical element can detect light emitted from the optical element and reflected off the fingertip. The reflected light is gathered by a detector, image sensor or light pickup device, and the magnitude and direction of motion is evaluated. In another configuration, the optical motion element 64 can be used as a digital pen used for recording natural or manual writing. The magnitude and direction of movement of a detected image is used to identify pen-like movement for recording information or images, for example natural writing, drawings, touch screen-type selections, and the like. Other configurations for the optical motion element 64 can also be used, and other motion tracking elements can be used, including gyroscopic elements, tilt-sensor elements or other accelerometers or inertial sensor elements.

Figure 7:
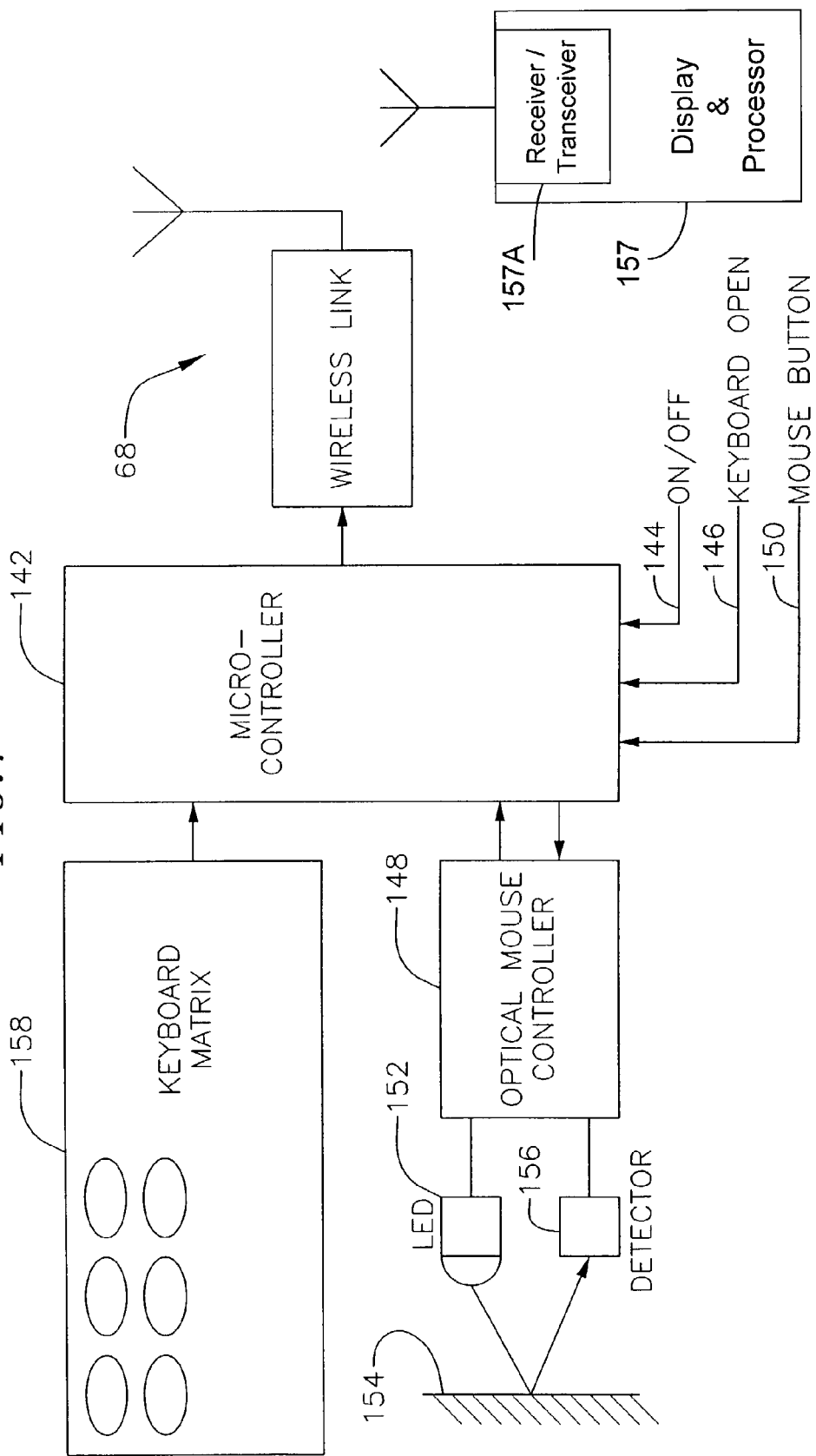
FIG. 7 is a schematic and block diagram of a circuit for use in conjunction with a user input device such as that illustrated in FIG. 1.
Figure 8:
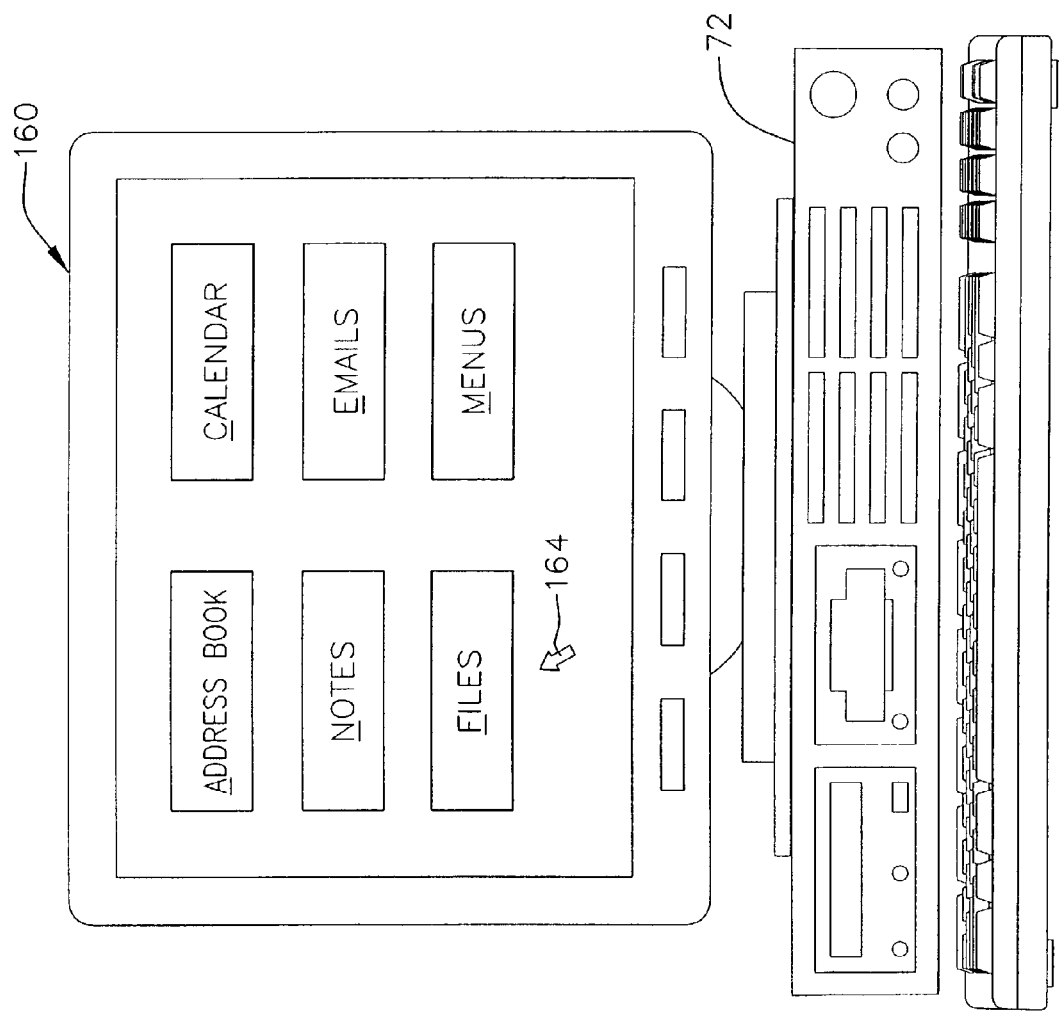
FIGS. 8–10 are schematics of a computer and display that can be used to receive data from a user input device such as that illustrated in FIG. 1, showing several modes of data entry for a user input device.

A communications link, such as a wired connection, or in the present example a wireless transmission link 68 (FIG. 7) is incorporated into the body 52 to transmit data or control information from the device 50 to a target component, such as a wrist watch 70 (FIG. 5), or a personal computer 72 (FIGS. 8–10), or any other suitable device. The transmission link 68 may take any number of forms, including a radio wave transmitter, an infrared transmitter or other suitable link. The target component includes suitable receiving hardware and software for receiving and interpreting the transmitted data, or for changing a display as determined by control signals from the device 50. The wireless transmission link hardware can be placed in a suitable location within the housing defining the body 52. The data transmitted by the wireless transmission link 68 can be any suitable data selected by the user and input according to manipulation of the keys 58, and the control information can be data sent by the device through the wireless transmission link to move, select or otherwise control an image, for example a cursor, a menu selection, or other presentation on a display. Both data representing alphanumeric or other characters input through the keys 58, and control data from the keys 58 or from the optical motion element 64 will be considered data for purposes of the signals transmitted by the wireless transmission link 68.

Considering the device 50 in more detail, the housing 52 is preferably longer from the first side 54 to the second side 56 than it is from a bottom side 74 to a top side 76, as viewed in FIG. 1. It should be noted that relative position terminology such as top and bottom and side is used merely for purposes of reference to the orientation of the examples shown in the drawings, and are not used as limiting in any way. The body is preferably relatively long and narrow, narrow to make easier manipulation of the device with one hand, for example for writing, and relatively long to accommodate a sufficient number of keys to form a key distribution approximating a conventional keyboard. In the example shown in FIGS. 1–3, the body is preferably straight at the top 78 of the first end 54, and is curved downward and toward tip between the bottom 80 and the optical element 64. The curvature is preferably gradual from top to bottom and toward the end surface 82 of the first end 54, forming a taper terminating at the optical element 64. The first end 54 is preferably substantially symmetrical from a front side 84 (FIG. 2) and a back side 86 about a center plane 88. The back side 86 preferably has the same curvature from the top 76 to a bottom edge 90, as viewed in FIG. 2, from the first end 54 to the second end 56. The end surfaces 92 and 94 of the second end 56 preferably have the same curvature from top to bottom (as viewed in FIG. 1) and from front to back (as viewed in FIG. 3). The curvature of the surfaces provides a more comfortable grip for the device and for easy movement, for example into and out of a pocket.

Figure 6:
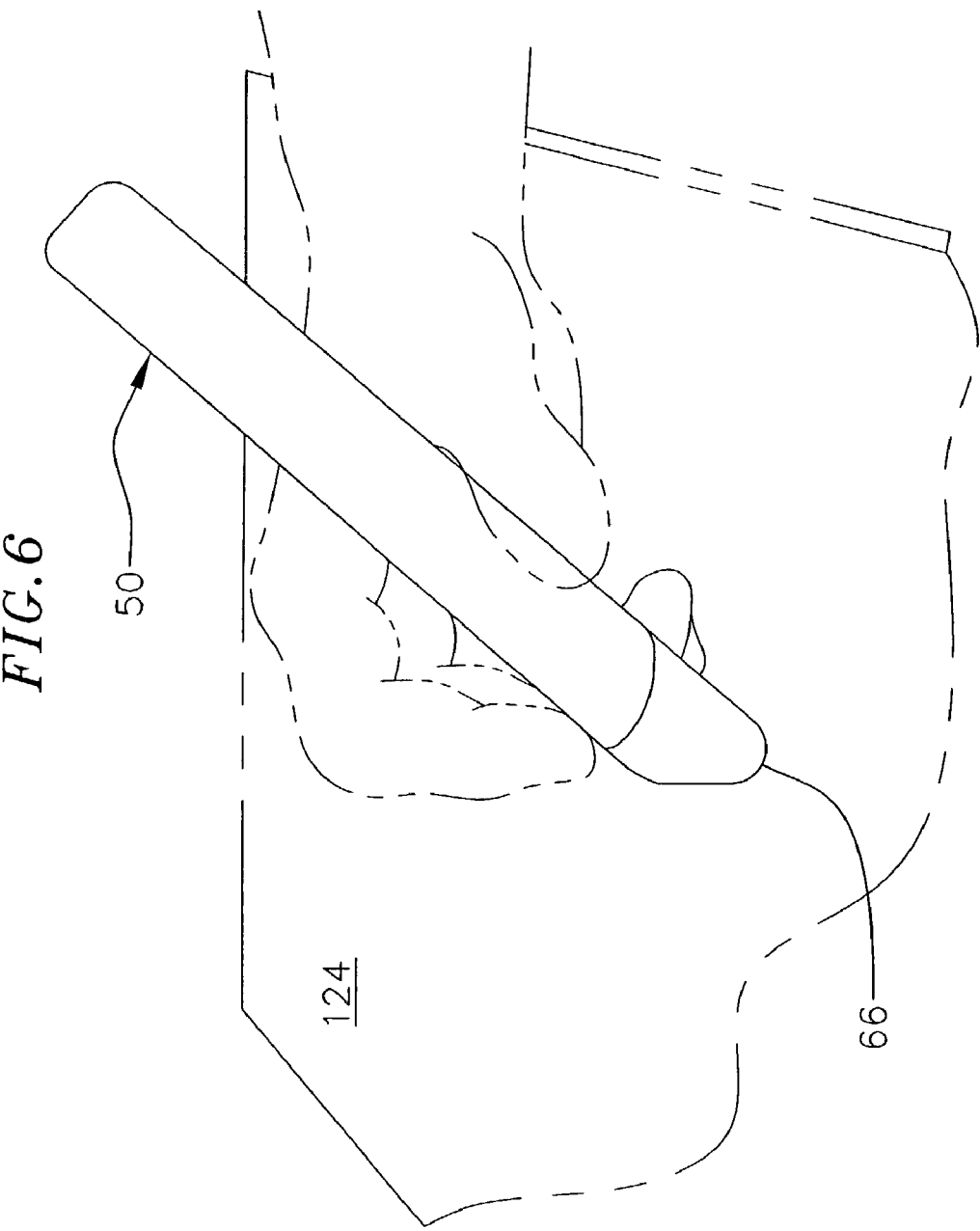
FIG. 6 is a side and perspective view of a user input device similar to that of FIG. 1 indicating a form in which the device is used for recording natural writing.

As can be seen in FIGS. 2–3, the device in the present example has a rounded wedge shape in transverse cross-section with the narrower portion at the bottom 90 and the wider portion at the top 76 (FIG. 2). The top of the device can comfortably rest between the thumb and forefinger, such as is depicted in FIG. 6. Other configurations of the outer housing of the device are also possible, both in terms of shape for external handling as well as shape for housing components within. Preferably, the outer configuration of the body of the device is relatively long from the first end 54 to the second end 56 and is relatively narrow to easily fit in the hand. The cross-sectional configuration of the body (when closed) is preferably small enough to fit within a pocket, and has a perimeter sufficiently small to allow wrapping a hand around the body. The body is preferably sized sufficiently between the bottom 90 and the top 76 to accommodate at least two rows of keys, for example of shown in FIG. 1, and the body is preferably sufficiently long to accommodate at least 10 keys. Additionally, the length of the body is preferably such that with a device is held with each end against a respective palm of the hand, the thumb of each hand can manipulate the respective keys in the middle of each row. For example, the left thumb can manipulate the keys corresponding to "T", "G" and "V", and the right thumb can manipulate the keys corresponding to "U", "J" and "N". Given the taper at the first end 54, the wide part of the wedge shape occurs near the top 76 of the body and the narrow part of the wedge occurs at the bottom 90. Additionally, the wide part of the body at the taper receives and holds the optical element 64.

The keys 58 are preferably arranged in rows, such as rows 96, 98, 100 and 102. The keys are preferably distributed and include designations for the alphabet using the same relative arrangement as exists with current keyboards. The first three rows 96, 98 and 100 each preferably have at least 10 keys, arranged as shown in FIG. 1 to follow the arrangement of the letters on a conventional keyboard. The right end key 104 in the second row 98 is preferably a carriage return or Enter key, the left end key 106 in the third row 100 can be a shift key, the ninth key 108 in the third row can be a punctuation key, and the right end key 110 in the third row can be a cursor control key. The fourth row 102 can include a space bar 112 approximately in the center thereof with one or more function keys 114 on each side of the space bar 112. Additionally, the 10 keys in the top row 96 can be used to enter numeric data, using the shift key 106 or one of the function keys 114 to select the desired number instead of the letter corresponding to the same key. Other character combinations are possible, and additional characters or functions can be assigned to the keys as desired.

The keys can be configured and shaped in a number of ways as desired. In the example shown in FIGS. 1–3, the keys are raised from the supporting surface, such as flat surface 60, and have a right-triangular shape with the hypotenuse 116 (FIG. 1) differentiating between a key manipulated with the left hand and a key manipulated with the right hand. As viewed in FIG. 1, the five keys in the first three rows to the left have the hypotenuse facing the upper right and may be manipulated with a left hand and the five keys to the right in each of the first three rows have the hypotenuse facing the upper left and can be manipulated with the right hand. Other shapes and configurations can be used as desired. Additionally, markings on the respective keys can be applied in a number of ways as would be known to those skilled in such designs.

In the example shown in FIGS. 1–5, the user input device 50 includes a hinged panel 118. The hinged panel 118 can be part of the body and coupled to it through a hinge 120. The interior surface 122 supports the third and fourth rows of keys and is preferably flat to complement flat surface 60, and signals from the keys may be connected to circuits in the rest of the body through the hinge 120, separate conductors between the hinged panel 118 and the body 52 or through other means. The surface 60 and the surface 122 preferably complement each other, so that for example when hinged panel is moved to a closed position so that the first and second rows of keys face the third and fourth rows of keys, the facing surfaces complement each other. The hinged panel can be moved from an open position such as that shown in FIGS. 1–5, to a closed position such as that represented by FIG. 6. In the open position, the hinged panel can rest flat on a surface, such as surface 124 depicted in FIG. 5, and the rest of the body of the device 50 can also rest flat on the surface. With the device is open and resting on a flat surface, the third and fourth rows of keys are preferably flat and their tops extend horizontally, and the first and second rows of keys extend on a slant relative to the horizontal, as the surface 60 and the surface 122 form an obtuse angle, as viewed in FIG. 2. If desired, other configurations of the respective rows of keys can be adopted, for example having all rows of keys extending horizontally. Other configurations may have some of the keys non-coplanar with others of the keys. In another configuration of the keys, the keys on the hinged panel can be configured to complement the spacing on the surface 60 between the keys in the first and second rows, so that when the hinged panel is closed against the body, the keys on the hinged panel face the surface 60, rather than facing the keys in the first and second rows. Inter-fitting the keys may help to save space in the size of the device when the hinged panel is closed. For example, the outer border shapes of the keys on the left half of the hinged panel maybe rotated counter clockwise 90 degrees about the center of their respective hypotenuse (while keeping the characters in their proper orientation). Similarly, the outer border shapes of the keys on the right half of the hinged panel maybe rotated clockwise 90 degrees about the center of their respective hypotenuse, so that when the hinged panel is closed, the hypotenuse of a key on the hinged panel will face the hypotenuse of a key on the body. This possible orientation of keys may be significant where the surfaces of the keys are raised from the upper surface of the underlying support, such as the hinged panel or the surface 60. Additionally, the space bar may include triangular-shaped surfaces to complement the keys and their adjacent spaces in the first row of keys on the body when the hinged panel is closed.

In the example of the device shown in FIGS. 1–6, the hinged panel preferably has a distance from a bottom edge 126 to a top edge 128 approximately equal to the distance from the bottom edge 90 to the top edge 76 of the rest of the body. Additionally, the outside curvature of the hinged panel preferably is a mirror image of the outside surface 86 of the body. The distance from the end 94 to the opposite end 130 is preferably less than the overall length of the device and is preferably several key widths longer than a row of keys. The end 130 preferably conforms to and nests into a side surface 132. When hinged panel 118 is closed, the outside surface along the outside of the hinged panel is preferably continuous or flush with the outside surface of the remainder of the body.

The hinged panel can be closed with the rest of the body 52 through an appropriate latch, hook, retainer or other releasable means (not shown). The hinged panel can be released through a button, actuator or release element 134 in the second end portion 56. A sensor, detector or other means 136 can be placed in the body 52, such as on the surface 60 (FIG. 1) or the surface 132, to recognize when the hinged panel is open or closed. The sensor 136 can then be used to activate or de-activate key circuits, activate or de-activate the optical element 64, or change its configuration, for example from optical mouse (FIGS. 4 and 5) to optical pen (FIG. 6). Batteries 138 can be used to power the circuits and components in the device.

The optical element 64 can take a number of configurations, and preferably has the capability of operating as an optical mouse. In the example discussed herein, the optical element 64 has the capability of operating both as an optical mouse in one configuration and as a motion detector for a digital pen in another configuration. Preferably, the optical element and the associated circuitry allows the configuration to change from one to the other, for example as a function of whether or about the hinged panel 118 is open or closed. When the panel is open, the optical element is configured to have a higher sensitivity sufficient to detect movement of a fingertip over the optical element, and when the panel is closed it is configured to have a lower sensitivity but sufficient to sense movement of the device along a surface so that the device can serve as a digital pen. The structure and control system for the optical sensing element 64 may be the same as that incorporated in the optical sensors or detectors developed by Agilent Technologies. The optical sensing element may be configured to sense patterns or use other methods of determining the magnitude and direction of movement of the device relative to a surface, whether in contact with the optical element 64 or spaced from it.

The optical element is preferably positioned in and supported by the tapered end 66 of the device. In the example shown in FIGS. 1–3, the optical element is in the first end portion 54, which is asymmetrical relative to the second end 56. Locating the optical element in the tapered end facilitates use of the device as a digital pen, and facilitates access to the optical sensor when configured as an optical mouse. Having the optical mouse extend outward of the keyboard allows the user comfortably to place a finger over or next to the optical sensor. In the example shown in FIGS. 1 and 2, a switch 140 is position under the tapered end and on the curved surface 82 to allow using the device in the manner of a mouse and right or left clicking the mouse to make selections. The default configuration for the switch 140 may be as a left click, and right click can be achieved through simultaneous activation or manipulation of a function key, for example. Other configurations are also possible. The optical sensing element and/or the switch 140 can be placed at other locations on the device, such as the second end, but the optical device is preferably placed in a tapered or convergent portion of the device when the device is to be used as a digital pen.

In the example shown in FIGS. 1–6, the device is controlled and operated through an appropriate system that would typically include a microcontroller 142 (FIG. 7) on a printed circuit board (not shown) placed within the body 52 of the device. The microcontroller would typically include an application-specific integrated circuit configured to receive input from an on off switch 144, which can be placed at any convenient location on the device. The microcontroller would also be configured to receive a keyboard open signal 146, which may be used to configure the device in several ways. For example, with the keyboard is open, the microcontroller 142 can activate the keyboard, and/or the microcontroller 142 can change the configuration of an optical mouse controller 148 from a digital pen configuration to an optical mouse configuration. When the keyboard is open, a circuit in the microcontroller 142 can be switched to sense signals 150 from the mouse button 140. With the keyboard closed, the optical mouse controller 148 can be configured to operate in a mode for a digital pen, for example. The optical sensing element typically would include a light source in the form of LED 152 for directing light to a surface or object 154, which reflects the light to detector 156. The detector 156 may be an imaging array for collecting the light and sending appropriate signals back to the optical mouse controller, which then send signals to the microcontroller. The signals from the optical mouse controller 148 are used to indicate the direction and magnitude of the relative motion between the device 50 and the surface 154. The direction and magnitude information is then sent over the wireless link 68 to a target device such as a personal computer, digital watch, or other device as desired, a processor and display shown schematically at 157 receiving signals through a receiver or transceiver 157A. The device also includes a keyboard matrix 158 coupled to the microcontroller 142 for sending signals representing alphanumeric data based on manipulation of the keys on the keyboard. The keyboard matrix 158 is arranged in the example of FIGS. 1–6 so as to have two rows of keys in the main body portion and two rows of keys in hinged panel. The keys are coupled to the keyboard matrix through appropriate circuits.

The wireless link may be a radio frequency link, such as the design developed under Bluetooth standards, or an infrared link or other suitable transmission standard. The data can be transmitted in real-time, or data can be stored and transmitted other than real-time. Using the wireless link, the user input device 50 can be used to input data to large number of electronic devices, including computers, digital recorders and PDAs, personal digital components such as digital watches, digital telephones, and many other devices. Additionally, such electronic devices can be designed with features other than data input being given greater design emphasis, thereby log reductions in size, changes in shape and other design changes previously limited by requirements for data input. A hardware connection can also be made for the device, if desired.

The user input device 50 can take a number of configurations, shapes, sizes and forms. In one form, a user input device having a panel that can be closed or otherwise brought into close proximity with the rest of the body would have a shape and size that would be comfortable to hold in an average-sized hand in a way that a pen or pencil would be held for writing. For example, the circumference of the closed device may be less than or within several inches more or less than the inside circumference of a person's thumb and forefinger when formed into a circle. Whether or not the user input device 50 is used as a digital pen, the size of the keyboard is preferably such as to permit access to the keyboard with the thumbs so that the thumbs can be used to operate the keys. Preferably, the size of the device and the size of the keyboard are such that the right and left thumbs can reach to the center of the keyboard when the device is held as shown in FIG. 4. Other factors relating to form, fit and function may be used to select the configuration, shape and size of the device. Preferably, the length is greater than several inches, possibly greater than 4 inches, and the length is preferably at least twice the width. The width maybe on the order of several inches, and preferably less than six or eight inches. The body, when closed, preferably has a perimeter that is less than eight or 10 inches.

The key layout can also take a number of forms. Preferably, there is a separate key for each letter of the alphabet, while numbers can be assigned to several of the alphabet keys and activated through a function key. In one configuration, as shown in the figures, alphanumeric symbols are incorporated on three upper rows of keys and a fourth row includes a space bar. The device can be configured to be placed on a flat surface with the keys extending relatively flat and parallel to the flat surface so that most or all the keys are at approximately the same level, or configured to rest as shown in FIG. 2.

Figure 5:
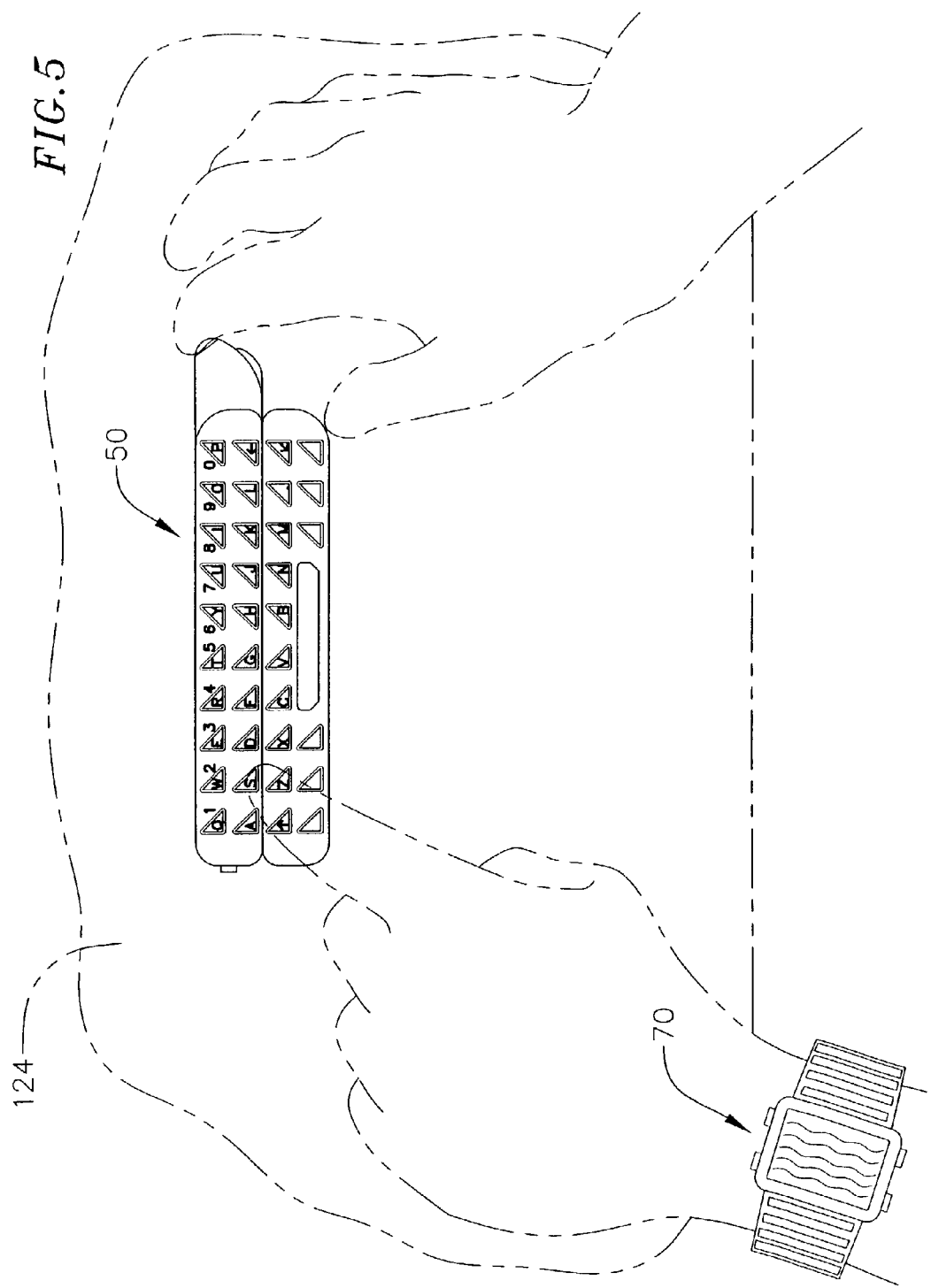
FIG. 5 is a top plan view of a user input device similar to that of FIG. 1 showing an example of the relative environment in which the device can be used on a support surface.

With the user input device 50, data can be input into electronic devices and the electronic devices can be controlled in a number of ways. When the device 50 is configured for using the keyboard, such as shown in FIGS. 4–5, alphanumeric data can be input to electronic device, such as a digital watch 70 or computer 72 controlling a display such as monitor 160. As representing FIG. 4, the input device 50 is sized and shaped to be conveniently portable and easily used manually. With the keyboard open, the user can manipulate the keys 58 to enter data into the microcontroller to be sent to the electronic device. In one example, such as that depicted in FIG. 8, the user can select a menu option, such as that for an address book. In one method, the user can activate a function key 114, such as one that may correspond to an "Alt" key, and at the same time press the "A" key to select the option for the Address Book. The user can then press the return key 104 to move to the appropriate screen corresponding to the address book. In another method, the user can move a finger 162 over the optical motion sensor 64, presently configured as an optical mouse, to move a cursor 164 (FIG. 8) to select the option for Address Book. The user can then actuate the switch 140 to move to the corresponding screen for the address book. The data, in the present examples either signals representing alphanumeric characters or signals for controlling an image such as cursor 164, is entered and sent real-time to the computer 72 for controlling the display on the monitor 160.

Figure 9:
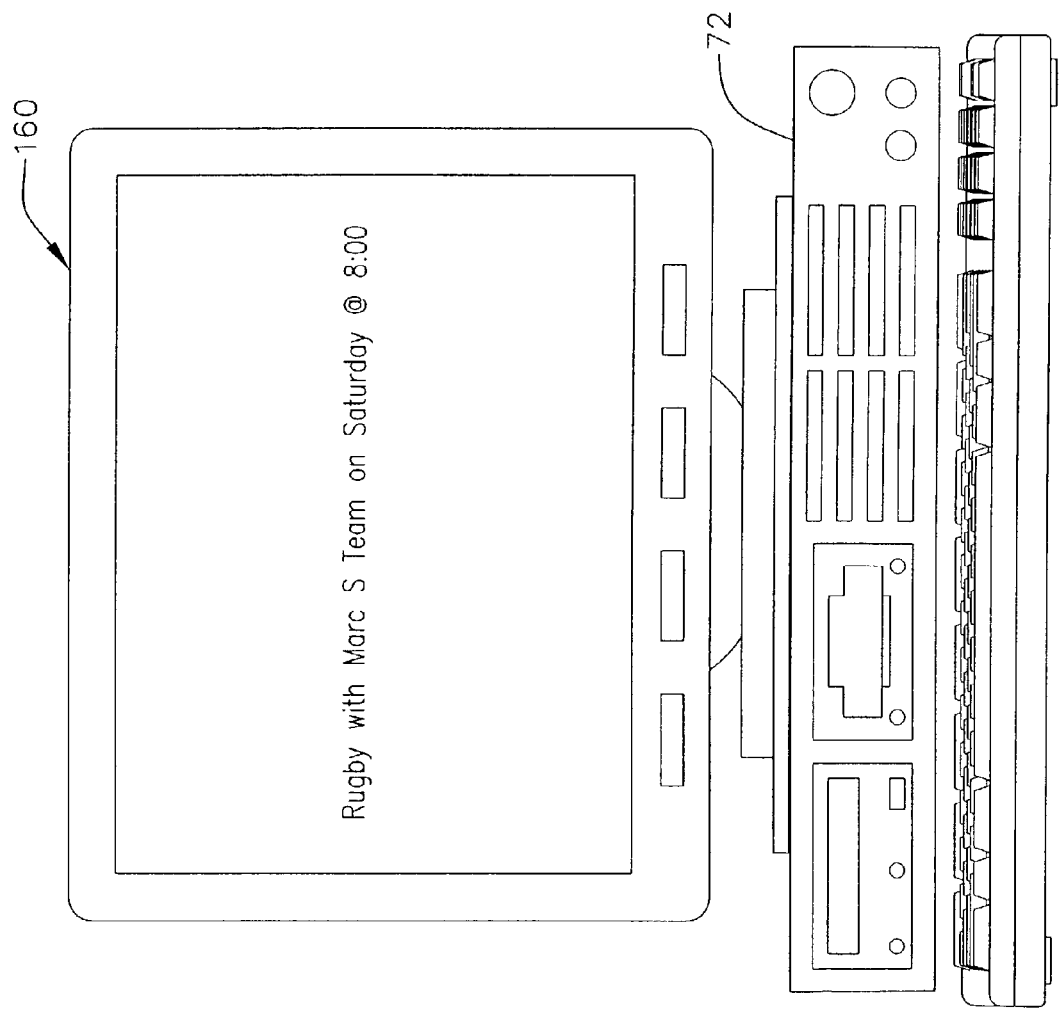

In the example shown in FIG. 9, alphanumeric data can be typed into the device 50 in a manner similar to that with a conventional keyboard. The data is then transmitted to the computer 72 for display on the monitor 160, which may be followed by entry into a database, calendar or other file as desired.

The user input device 50 can also be placed open so as to rest on a surface, such as a flat surface 124, so the data can be entered into the desired electronic device, such as watch 70. As is illustrated in FIG. 5, entry of data into a digital watch is made difficult by the small size of the watch. However, with conventional memory capabilities and software options, large amounts of data and functions can be incorporated into digital watches, but typically limited by the modes of data entry. Data entry using a user input device 50 expands the possibilities for using such digital equipment.

Figure 10:
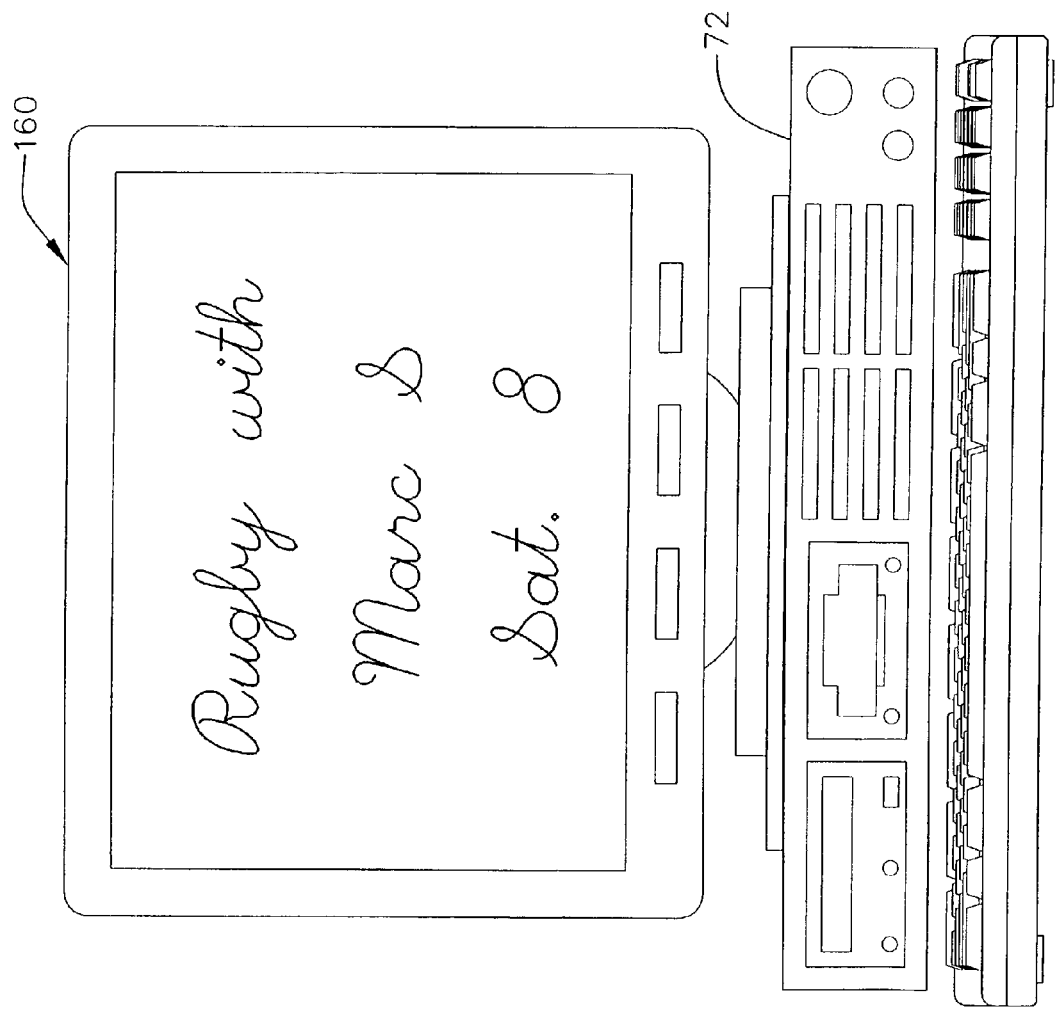

In another mode of data entry, the user input device 50 can have the keyboard in a closed configuration, such as that shown in FIG. 6, and the microcontroller 142 operates to place the optical mouse controller and other appropriate subsystems into a digital pen mode for recording natural writing. The user input device 50 is held in a writing hand with the tapered point 66 near or against the surface. The user then moves the device 50 along the surface in a writing motion to produce and send to the computer 72 a handwritten message to be displayed on the monitor 160, such as is shown in FIG. 10. The data can be stored as an image in the computer 72, in an appropriate memory device, for the message can be converted to text, if desired, using an appropriate conversion routine.

The user input device 50 in one or another configuration can be used as a universal data input device appropriate for use in a large number of electronic devices. The device can easily be made portable and convenient to use, and can be made small in size. The device can be used open or closed, as keyboard or mouse input or as a digital pen, for example. The device can also expand the capabilities of many digital devices, and also allow a change in emphasis in the design of such digital devices, for example so that data entry is less important as a design criterion.

Having thus described several exemplary implementations of the invention, it will be apparent that various alterations and modifications can be made without departing from the inventions or the concepts discussed herein. Such operations and modifications, though not expressly described above, are nonetheless intended and implied to be within the spirit and scope of the inventions. Accordingly, the foregoing description is intended to be illustrative only.

What is claimed is:

1. A user input device comprising:
    a body portion extending from a first side portion to a second side portion, the body portion movable between a first position and a second position;
    a plurality of keys representing a plurality of characters arranged on the body portion between the first and second side portions;
    a motion tracking element on the body portion for moving a display image, the motion tracking element operable as a first mode of input when the body is in the first position and operable as a second mode of input when the body is in the second position, wherein the second mode of the motion tracking element comprises a digital pen; and
    a transmitter on the body portion for electromagnetically transmitting data away from the body portion.

2. The device of claim 1 wherein the body portion includes a length from the outside of the first side portion to an outside of the second side portion and a width and wherein the width is significantly less than a length.

3. The device of claim 1 wherein the body portion is asymmetrical about a longitudinal plane.

4. The device of claim 1 wherein the body portion includes a key for each letter of an alphabet.

5. The device of claim 4 wherein the plurality of keys are arranged in four rows.

6. The device of claim 5 further including a panel linked to the body portion and movable relative to the body portion and wherein the panel includes two rows of keys.

7. The device of claim 6 wherein the body portion includes two rows of keys and wherein the panel is movable to a position where the keys on the panel face the keys on the body portion.

8. The device of claim 1 wherein the motion tracking element is positioned at a first end of the body portion.

9. The device of claim 8 wherein the motion tracking element includes a sensor and a processor for identifying movement of the device relative to a surface.

10. The device of claim 9 further comprising a key panel movable between open position corresponding to the first position of the body portion and a closed position corresponding to the second position of the body portion and wherein the processor can identify movement according to the first and the second modes wherein the panel is open and wherein the panel disclosed.

11. The device of claim 9 wherein the motion tracking element is configured to detect movement of a human finger.

12. The device of claim 9 wherein motion tracking element is configured to detect movement of the device over a surface.

13. The device of claim 12 wherein the motion tracking element is positioned at a first end of the body portion and wherein the first end of the body portion is tapered.

14. The device of claim 13 further comprising a mouse switch at the first end of the body portion.

15. The device of claim 1 wherein the transmitter includes means for transmitting radio waves.

16. The devise of claim 1 wherein the first mode of the motion tracking element comprises an optical mouse.

17. The user input device of claim 1 wherein the first position comprises an open body position and the second position comprises a closed body position.

18. A user input device comprising a body portion movable between a first position and a second position having a first side portion and a second side portion, a plurality of keys on the body portion for entering information into the device, an optical motion element operable as a first mode of input when the body is in the first position and operable as a second mode of input when the body is in the second position, wherein the second mode of input of the optional motion element comprises a digital pen, the optical motion element being on the first side portion and configured to detect relative motion between the body portion and an adjacent surface, a processor for receiving signals from the plurality of keys and a data transmission element associated with the body portion for receiving data from the processor and transmitting signals representing the information entered into the device.

19. The user input device of claim 18 wherein the plurality of keys include alphanumeric characters visible and associated with the plurality of keys.

20. The user input device of claim 19 wherein the plurality of keys includes rows of keys arranged with the alphabet characters in the manner of a conventional keyboard.

21. The user input device of claim 18 wherein the optical motion element is an optical mouse.

22. The user input device of claim 21 when the processor and the optical mouse can be configured so that the user input device can operate as a mouse for moving an image on a display in the first mode and as a recorder for recording movement of the user input device relative to an adjacent surface in the second mode.

23. The user input device of claim 22 wherein the body portion is elongated and configured to be capable of being held in an average adult hand, wherein the first side portion of the body portion includes a converging tip and wherein the optical mouse is located in the converging tip of the body portion.

24. The user input device of claim 21 wherein some of the plurality of keys are positioned on a movable portion of the body, movable between a first key position and a second key position, and wherein the processor includes means for sensing when the movable body portion is in the first key position.

25. The user input device of claim 24 further including a sensor for providing a signal to the processor for indicating when the movable portion of the body is no longer in the first key position.

26. A process for controlling an image on a display, the process comprising the steps of:
    placing a housing within reach of a hand for manipulation of at least one key on the housing, the housing being movable between an open position and a closed position;

moving a finger within the field of view of an optical motion element in the housing with the housing in the open position and detecting the magnitude and direction of movement of the finger relative to the optical motion element;

moving the housing along a surface with the housing in the closed position and detecting movement of the housing along the surface through the optical motion element; and transmitting from the housing to a receiver electromagnetic signals representing the magnitude and direction of at least one of movement of the finger and movement of the housing.

27. The process of claim 26 further comprising the step of opening a keyboard in the housing containing the at least one key and manipulating the at least one key.

28. The process of claim 27 further comprising the step of sensing when the keyboard is open.

29. A system for controlling an image on a display, the system comprising:

a user input device having a body portion movable between a first position and a second position, manual input keys for receiving manual input from a user, a motion tracking element on the body portion operable as a first mode of input when the body is in the first position and operable as a second mode of input when the body is in the second position, wherein the second mode of the motion tracking element comprises a digital pen, and a transmitter coupled to the input keys and to the motion tracking element for transmitting signals; and a display coupled to a receiver for receiving, signals from the transmitter.

30. The system of claim 29 wherein the body portion includes a closable panel and the manual input keys are positioned on the closable panel.

31. The system of claim 29 wherein the first mode of the motion tracking element comprises an optical mouse.

32. The system of claim 29 further including a switch on the body portion for manual activation for making a selection corresponding to an image displayed on the display.

33. The user input device of claim 29 wherein the first position comprises an open body position and the second position comprises a closed body position.

* * * * *